United States Patent
Faulkner et al.

(10) Patent No.: US 8,918,082 B2
(45) Date of Patent: Dec. 23, 2014

(54) DUAL MODE DEVICE WITH MAC ADDRESS CAPTURE AND PAIRING

(71) Applicant: AT&T Mobility II LLC, Atlanta, GA (US)

(72) Inventors: Max Glenn Faulkner, Roswell, GA (US); Thomas Bonner, Smyrna, GA (US); Charles M. Link, II, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 14/280,291

(22) Filed: May 16, 2014

(65) Prior Publication Data

US 2014/0308923 A1    Oct. 16, 2014

Related U.S. Application Data

(63) Continuation of application No. 11/738,888, filed on Apr. 23, 2007, now Pat. No. 8,768,356.

(51) Int. Cl.
*H04M 1/66* (2006.01)
*H04W 12/08* (2009.01)

(52) U.S. Cl.
CPC .............. *H04W 12/08* (2013.01); *H04W 48/25* (2013.01)
USPC .......................... 455/411; 455/436; 455/552.1

(58) Field of Classification Search
None
See application file for complete search history.

(56) References Cited

U.S. PATENT DOCUMENTS

| | | |
|---|---|---|
| 2005/0186948 A1 | 8/2005 | Gallagher et al. |
| 2005/0265279 A1 | 12/2005 | Markovic et al. |
| 2006/0187882 A1 | 8/2006 | Kwak et al. |
| 2006/0245392 A1 | 11/2006 | Buckley et al. |
| 2007/0083470 A1 * | 4/2007 | Bonner et al. .................. 705/51 |
| 2007/0104126 A1 | 5/2007 | Calhoun et al. |
| 2007/0155324 A1 | 7/2007 | Lee |
| 2008/0151842 A1 | 6/2008 | Tysowski et al. |

OTHER PUBLICATIONS

Mobipay. Take your Mobile and Pay. 2002, 1 page.
International Search Report and Written Opinion for PCT Patent Application No. PCT/US2008/5849, 10 pages.
Office Action dated Jan. 5, 2010 for U.S. Appl. No. 11/738,888, 35 pages.
Office Action dated Dec. 15, 2011 for U.S. Appl. No. 11/738,888, 30 pages.
Office Action dated Nov. 26, 2013 for U.S. Appl. No. 11/738,888, 30 pages.

* cited by examiner

*Primary Examiner* — Suhail Khan
(74) *Attorney, Agent, or Firm* — Amin, Turocy & Watson, LLP

(57) ABSTRACT

Seamless connectivity by a user device between a licensed and an unlicensed network is provided through capturing of MAC address information relating to one or more access points servicing the licensed and/or the unlicensed networks. One or more access points can be chosen as a designated access point. If the access point is available for communication with the device and other device criteria is met, the access point is designated. If designated, when the device is in vicinity of the access point seamless and transparent connectivity is automatically established with that access point.

20 Claims, 10 Drawing Sheets

DUAL MODE DEVICE WITH MAC ADDRESS CAPTURE AND PAIRING

CROSS-REFERENCE TO RELATED APPLICATIONS

This application is a continuation of, and claims the benefit of priority to, U.S. patent application Ser. No. 11/738,888, filed Apr. 23, 2007 and entitled "DUAL MODE DEVICE WITH MAC ADDRESS CAPTURE AND PAIRING", the entirety of which is incorporated herein by reference.

BACKGROUND

Mobile devices (e.g., mobile phones, personal digital assistants (PDAs), other suitable user equipment for communication, and so forth) can be utilized as full-service computing mechanisms. For example, many of the most recent and advanced mobile devices can be associated with word processing software, web browsing software, electronic mail software, accounting software, and various other types of software. Moreover, mobile devices can be utilized as cameras, video cameras, audio recorders, and the like. Additionally, mobile devices have decreased in both size and cost and modern mobile devices are often small enough to slip into an individual's pocket without discomfort. Furthermore, network coverage has expanded to cover millions, if not billions, of users and many mobile network service providers offer phones and/or disparate devices at extremely low cost to customers who contract for service with such providers.

Mobile devices can operate on a licensed wireless service or network (e.g., Global System for Mobile Communications (GSM), Wireless Code Division Multiple Access (WCDMA), Universal Mobile Telecommunications System (UMTS), and so forth), which can be, for example a wireless access point through the Internet in a home and/or an unlicensed wireless network (e.g., unlicensed mobile access (UMA)), which can be through a wireless service provider. A mobile device that is capable of operating on both the licensed and the unlicensed networks (e.g., 802.11 networks) can potentially bypass established networks (e.g., private networks). In addition, there is a growing tendency for users to maintain a single contact information (e.g., telephone number) while at home or away from home. Thus, it is becoming more prevalent to discontinue use of a traditional landline phone and utilize a mobile device in its place. In such a manner, users can be accessed anytime, anywhere through a single contact information.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts in a simplified form as a prelude to the more detailed description that is presented later.

In accordance with one or more embodiments and corresponding disclosure thereof, various aspects are described in connection with allowing a user with a dual mode handset (e.g., functionality through both a licensed and an unlicensed network) to establish designated wireless access points through which service is available, even if such service is through the unlicensed network. The designation of access points allows seamless connectivity between both licensed and unlicensed networks. The various networks connectivity can be performed in manner that is transparent to a user. Such access points can be designated by utilizing an unique Medium Access Control (MAC) Address associated with each access point.

In some embodiments, a limited number of access points can be designated by a user and/or device to mitigate the chances of a fee-based connectivity (e.g., coffee shop) to be bypassed. The number of times, or frequency with which, the access points can be changed or selected can be limited. Some access points, through its corresponding MAC Address, can be predefined as an access point that cannot be selected through the various embodiments. In some embodiments, the access points defined can be limited to certain geographic area(s).

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
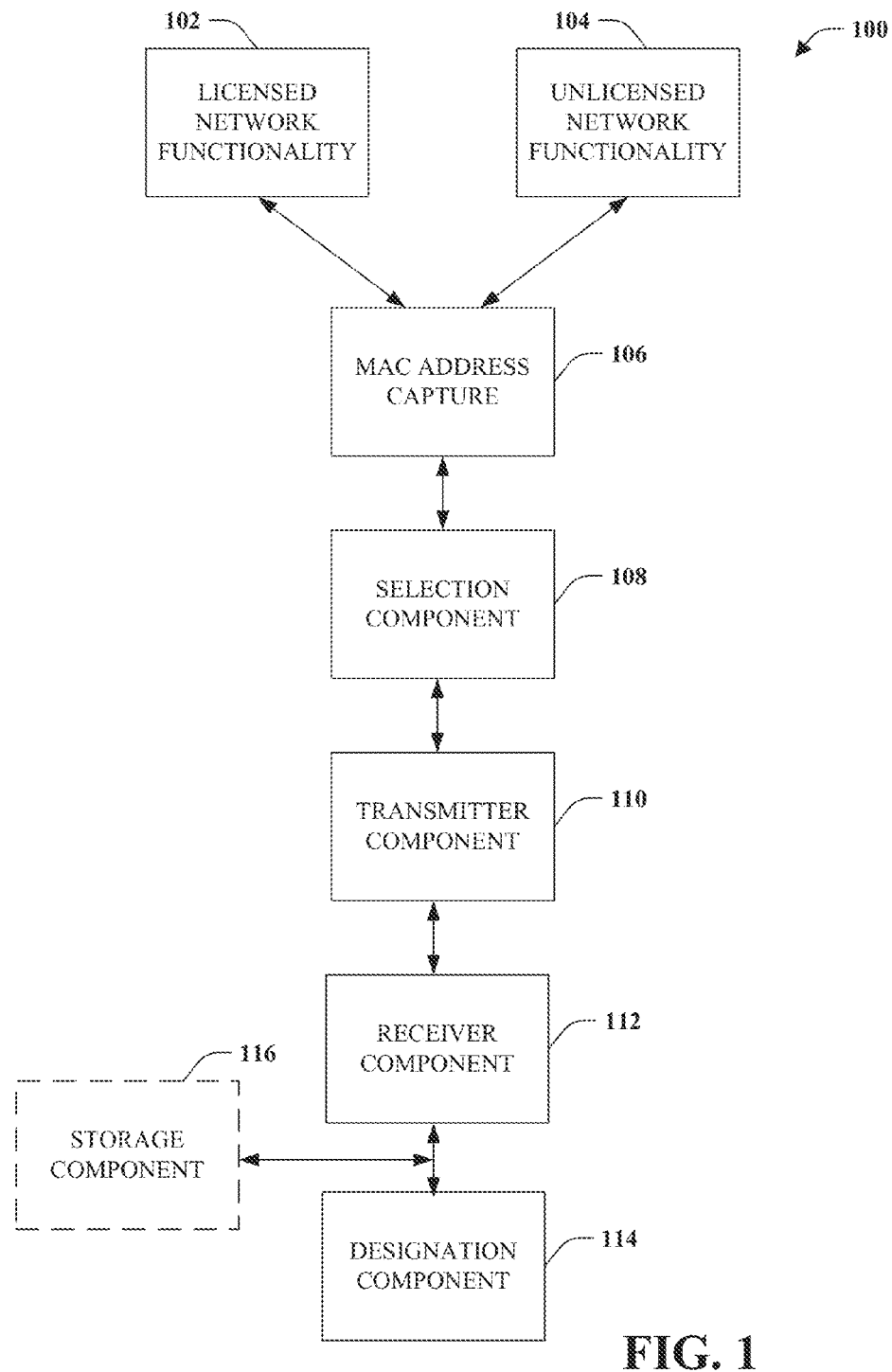
FIG. 1 illustrates a dual mode device system with MAC address capture.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

Referring initially to FIG. 1, illustrated is an exemplary communications system 100 that can be configured to allow a device to seamlessly communicate on both a licensed wireless network (e.g., Global System for Mobile Communications (GSM), Wireless Code Division Multiple Access (WCDMA)) and an unlicensed wireless network or unlicensed mobile access (UMA) network. System 100 provides seamless and transparent transition between the public network and the unlicensed network, thus providing the user with uninterrupted communication. Further, system 100 can provide the user with a mobile device that can be utilized in pre-designated areas and can allow others to communicate with such user through utilization of a single contact reference number (e.g., telephone number or other reference number associated with the mobile device). System 100 can be included within a mobile device (also referred to as user device, device, or the like).

In further detail, system 100 includes a licensed network functionality 102 and an unlicensed network functionality 104. These functionalities 102, 104 allow the system 100 to operate in a dual mode, over both the licensed and the unlicensed networks. For example, system 100 can utilize 802.11 to communicate on these networks. Associated with each network is an access point that can be identified by a MAC address. This MAC address is a unique number associated with each wired and wireless device (e.g., Internet connection, Internet device, Ethernet device, LAN device, PCMCIA card, personal computer, mobile device and so forth). A MAC address capture component 106 can be configured to obtain the MAC address for each device or component (e.g., access point) within range of the mobile device. As the system 100 comes within range of different MAC addresses, the MAC address capture component 106 can automatically identify such addresses. In some embodiments, the user manually instructs the MAC address capture component 106 to seek and obtain any MAC address within range. For example, a user may desire to established connectivity with a MAC address in range of the user's home and another MAC address in range of the place of employment. In such a manner, the home and the place of employment (or another place) can be established as pre-designated areas.

As one or more access points are selected, through interaction with a selection component 108. The selection component 108 can be configured to receive a user or device input choosing an access point, such as by providing menu selection options. Further information relating to selection of one or more access points will be provided below. Selection component 108 can allow the user to establish a designated and possibly limited number of wireless access points through which communication with the dual mode handset can occur seamlessly. For example, a user can select a first wireless access point at home and a second and third wireless access point at work (or other places). However, the user should not be able to designate a coffee shop, airport, hotel, foreign country or the like as a designated wireless access point in an attempt to bypass such networks, which might be fee-based networks and/or roaming areas.

A transmitter component 110 can communicate the selection information with a server or Service Control Function (SCF) for designation of seamless communication through utilizing of the at least one access point MAC address. The message can be communicated through utilization of unstructured supplementary service data (USSD) technology or another type of technology. USSD technology might be implemented while mitigating the amount of extra hardware or special client software to be installed on the user device. USSD can be selected for its ability to transport this type of message over a large number of wireless carriers' networks. USSD is a reliable transport mechanism that might not need General Packet Radio Service (GPRS), Enhanced Data for GSM Evolution (EDGE) or High-Speed Downlink Packet Access (HSDPA) equipped base stations. USSD messages can be transported first to the user's Home Location Register (HLR) and then to a USSD application server, for example. Thus, in accordance with some embodiments, USSD can be utilized to collect MAC addresses on WiFi to mitigate a user bypassing a home network and/or roaming networks to obtain free wireless access.

Various information can be included in the message by the transmitter component 110, such as a mobile network code and/or a cell site ID, which can identify the location of the mobile device. Thus, if the message identifies the system utilized by the device as well as the cell site, the device can be limited to selecting access points in a certain geographic area, if such limiting is desired. The message can also include dates, times, or other indications associated with when various access points where selected, which can limit the number of changes/updates/additions made within a certain interval (e.g., 60 days). This can mitigate a user re-acclimating a device each time a coffee shop is entered, for example, in an attempt to bypass the pay version of that network.

The SCF can review the information and determine which access point was selected or designated. Based in part on the information received, the SCF can determine whether the user is eligible to change the designated access point and/or whether the access point is an authorized access point (e.g., not associated with an airport, hotel, coffee shop, and so forth). If the mobile device is authorized to designate the access point (e.g., a sufficient interval has passed since the access points have been changed, the access point is not a restricted access point associated with a fee-based network, and so on), receiver component 112 can receive a message, sent by SCF, indicating that the access point has been approved as a designated access point, which can be maintained in a designation component 114. The change to the designated access point can be made and when the mobile device comes within range of that access point, the device seamlessly switches to that MAC address providing seamless transition between networks. If the user is not authorized to change the access point and/or if the access point is not allowed as a designed access point, an error message can be sent to the user, and received by the receiver component 112.

USSD is a session oriented protocol ((SMS is message oriented), thus if USSD is utilized, a response message (e.g., "Accepted", "Denied", and so forth) can be delivered directly to the user's device. USSD provides a smooth transaction that can be validated by the device and, in some embodiments, the service provider.

The MAC Addresses, authorization message and/or error message can be retained in a storage component 116. The MAC Address information can be retained allowing the device to identify the access point when the device is within range of the access point. The authorization message can be retained to allow the device to establish connectivity with the access point when the devices are within range. The error message can be retained to allow the device to determine whether the access point is not authorized for the service (e.g., an access point associated with a coffee shop) or whether there is another reason that connectivity with the access point was denied (e.g., number of access points exceeded, too many access point changes within a particular period). Depending on the reason for the error, the device can selectivity determine whether connectivity with the access point should be requested the next time the devices are within range of each other.

By way of example, and not limitation, the storage component 116 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 2:
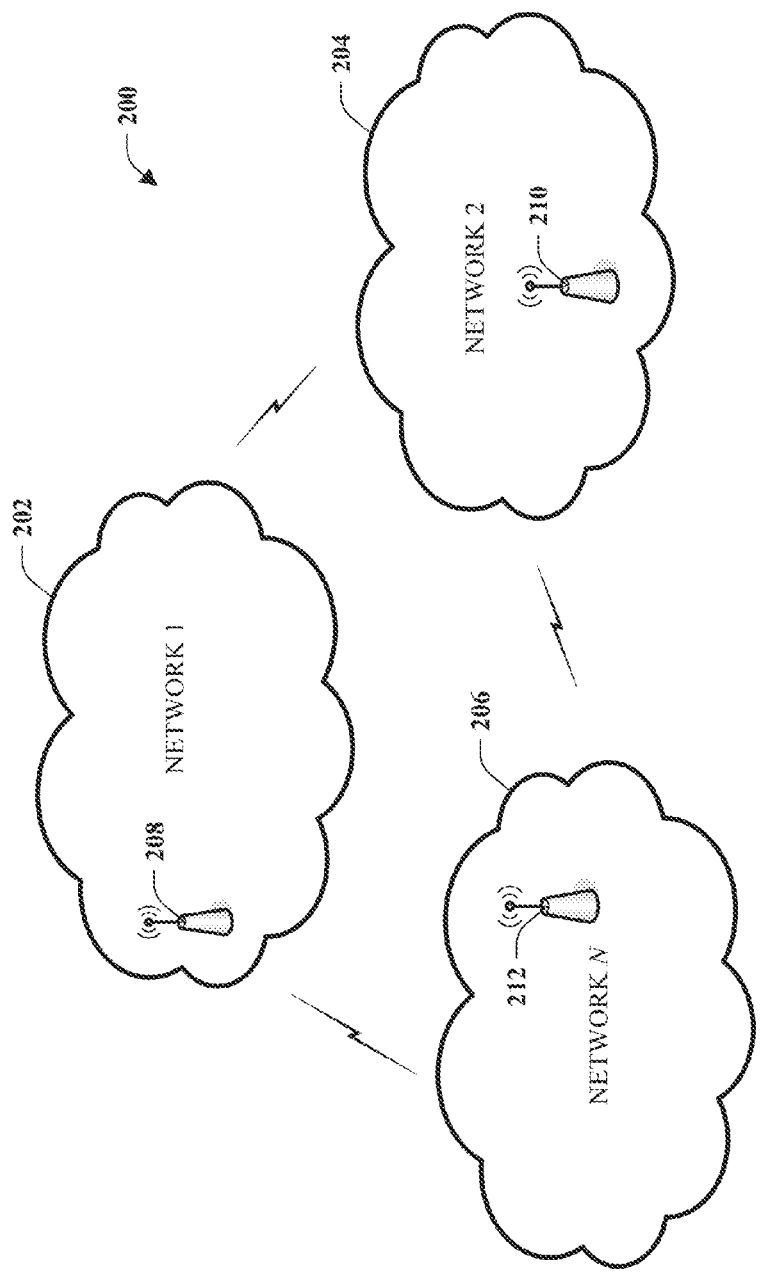
FIG. 2 illustrates an exemplary environment that can be utilized with the disclosed embodiments.

FIG. 2 illustrates an exemplary environment 200 that can utilize the disclosed embodiments. As a device user travels from place to place, various networks may be encountered through which connectivity with the device may be desired. Many of these networks may be operated by a service provider. However, there may be networks that are not operated by a service provider but through which the user would like connectivity (e.g., public networks). In order for a user to have the desired connectivity, even in places where a network may have limited availability, the user can designate a number of networks or access points associated with those networks.

For example, a user may encounter a first network 202, which can be a network accessible at the user's home. A second network 204 may be a network accessible at the user's place of employment. Other networks 206, labeled Network N, where N is an integer greater to or equal to one, may be accessible to the user. For example, the user's place of employment might have two or more networks servicing the business. The user, through the mobile device, should have the ability to select one or more networks through which service should be available, regardless if the networks are licensed or unlicensed networks.

Each network 202, 204, 206 can be associated with an access point 208, 210, 212. Each access point 208, 210, 212 can cover a geographic region, cell or network and further can have an unique MAC address that distinguishes each access point from the other access points. This MAC address is broadcast periodically or continuously allowing devices within range of the access point to identify that there is an access point through which connectivity can be established. It should be understood that the networks 202, 204, 206 can be overlapping, wherein two or more access points may have coverage over at least a sub-portion of a network. In addition, there can be networks between the networks illustrated through which connectivity can be established. It should be understood that the networks illustrated represent the networks (e.g., access points) pre-designated by the device as an example.

In accordance with some embodiments, a user, through a user device, can configure one or more wireless access points which are active for a given time period (e.g., 30 days). If one or more of the configurations need to change within the given time period, a special customer service call can be made to allow such reconfiguration. For example, if a user is allowed three wireless access points and one access point is no longer utilized (e.g., the user has changed employment and the wireless access points for work have changed), the user can contact customer service to request the reconfiguration of the wireless access point to the new place of employment. In some embodiments, the configuration to the access points can be changed within the predetermined period through other techniques, such as website access, in-person contact, or through other manners. For example, it is acceptable to reconfigure a wireless access point once every 30 days and the user bought a new wireless access point and configured it five days ago. If lighting strikes and destroys the wireless access point and it no longer works, overriding the configuration and the interval should be allowed so that the user can gain access through a new access point.

Figure 3:
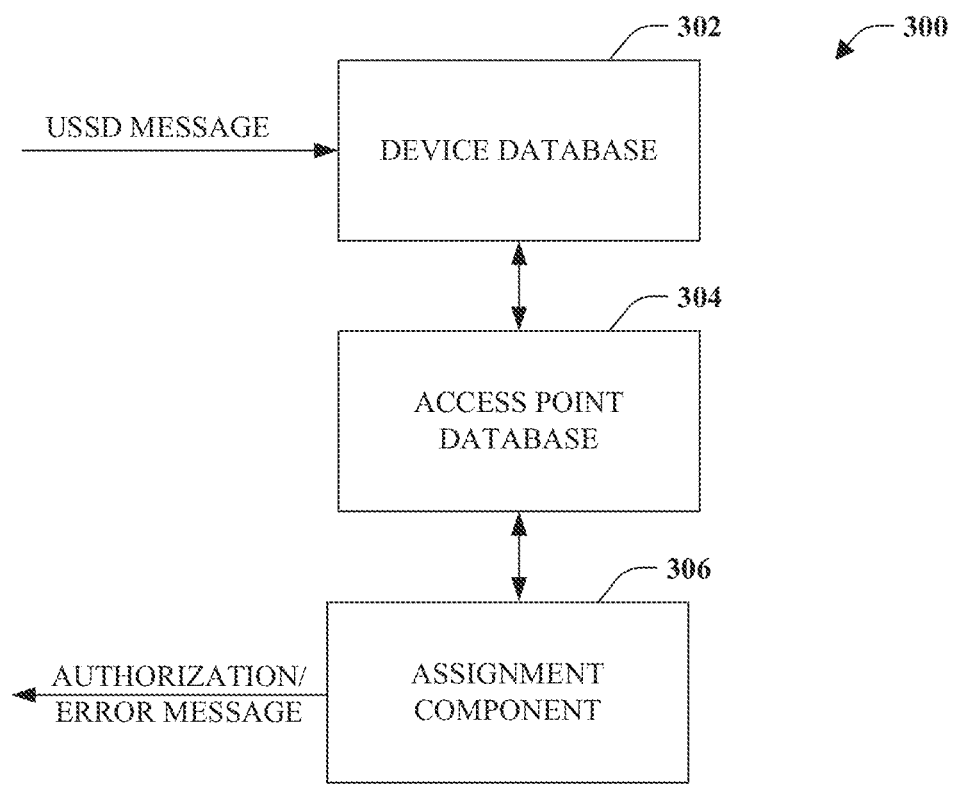
FIG. 3 illustrates a system for allowing a device to designate one or more access points through which connectivity can be established.

FIG. 3 illustrates a system 300 for allowing a device to designate one or more access points through which connectivity can be established. System 300 can be configured to allow a device user to utilize the device (e.g., phone number) to receive incoming communications regardless of the location of the user. A wireless access point can broadcast its MAC address to allow devices within the network served by the access point to communicate with such access point. As the device captures the broadcast parameters from the access point and a macro-system, a message that includes the information can be sent to a server or network database. Such a message can be sent in a USSD message or another type of message, provided the server or network database can interpret the message.

The message can be sent wirelessly or through a wired means. For example, one of the desired access points selected is an access point associated with a user's weekend cottage that is at a lower elevation than the surrounding landscape, limiting the wireless coverage at the weekend cottage. In such a situation, the message can be sent through a landline, through a GSM message, an access point in conjunction with broadband connectivity and/or through another format and/or means.

The server can receive the USSD message and a device database 302 can be accessed to pair the message with device information, such as a unique identifier associated with the device. Information contained in the device database 302 can include information relating to the access points with which the device can obtain connectivity. Other information can include data regarding when the access point was requested for connectivity to establish if a particular interval has passed to limit the frequency with which the access points can be changed.

The access point identified in the USSD message can be matched against information contained in an access point database 304. Such information in the access point database 304 can include whether the access point (identified by the MAC address) can be selected by the user. For example, if the requested access point is associated with a coffee shop or other place that provides pay-per-use Internet access or if the access point is in a foreign country or in other places where unlimited access is undesirable, the device should not be allowed to select such an access point.

An assignment component 306 can be configured to selectively assign the requested access point with the device or the deny access to the access point. A device can be paired with one or more wireless access points. For example, a device can be paired with three access points, one associated with a home and two associated with an office. An algorithm can be utilized to limit the number and frequency with which the access points are changed. For example, a user should not be able to pair the device with the wireless access points at each coffee shop visited. In addition, pairing the device and the access point should not be dependent upon the IP address of the access point since most home access points are tied to a DSL or cable modem whereby the address is dynamic. Thus, an alternative indicator for pairing is the MAC address of the access point.

Authentication component 306 can populate the device database 302 and the access point database 304 with the MAC address for allowed connections. A message can be sent to the device that includes the MAC address and subsequent operation from that MAC address can be permitted. The device can also be populated with parameters to allow it to automatically establish an unlicensed wireless access connection. In some embodiments, a parameter can include a Service Set Identifier (SSID) and keying on the SSID captured by the device can mitigate wasted power when trying to establish a connection to an access point that might not be target.

Figure 4:
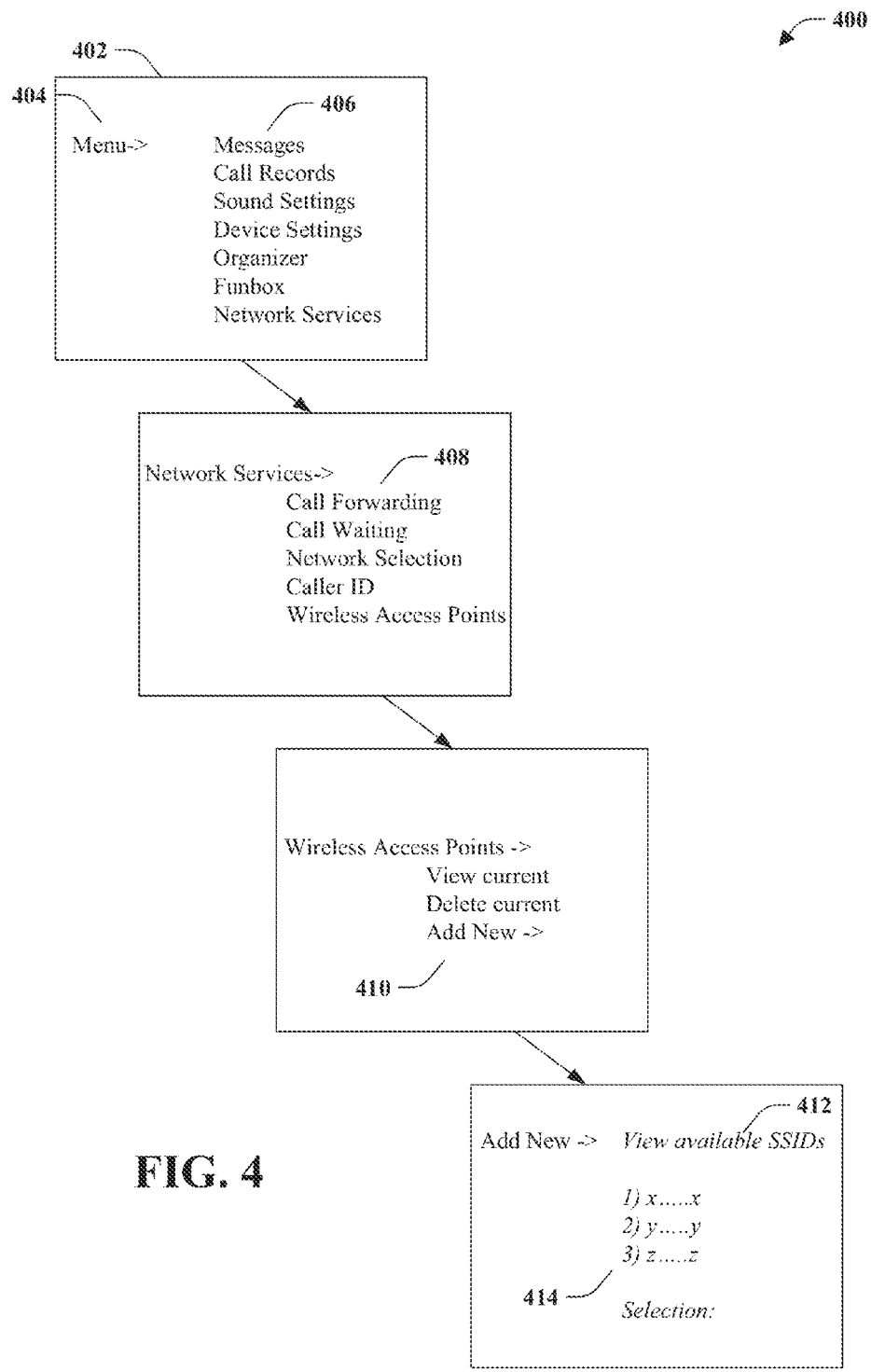
FIG. 4 illustrates exemplary screen shots that can be utilized with the embodiments disclosed herein.

With reference now to FIG. 4, illustrated are exemplary screen shots that can be utilized with the embodiments disclosed herein. Prompts or menu selections on a display screen or through another user perceivable means (e.g., audio) can be provided to assist the user with access point section. The user can navigate through the various screens to access the desired information.

Illustrated at 402 is an exemplary first menu screen, such as a main menu for a mobile phone. The main menu 404 can display various submenus 406 that the user can select. For example, the submenus 406 can include "Messages", which can allow a user to hear (e.g., voice) or see (e.g., text) messages; "Call Records", which can include a listing of calls received, sent, missed, and so forth. Other submenu options 406 can include "Sound Settings" and "Phone Settings", which can allow the user to change various parameters relating to the mobile phone. "Organizer", and "Funbox" are other submenus 406 that can be provided allowing the user to perform other functions with the device.

A submenu option "Network Services" call allow the user to select one or more access points. When a submenu option 406 is selected, such as by highlighting the option and pressing "enter" or "okay" or through voice commands, further submenu options 408 can be presented. These submenu options 408 can be displayed in a drop down menu or through other visual means and/or audible means. The various submenu options 408 provided can include "Call Forwarding", "Call Waiting", "Network Selection", Caller ID", and "Wireless Access Points". Thus, the menu options allow the user to drill down into the various submenus available.

As illustrated, "Wireless Access Points" is selected and options 410 relating to wireless access points can be presented (e.g., visually, audibly) to the user, such as through a display. These options 410 can include "View Current" access point(s), "Delete Current" access point(s), and "Add New" access point(s). When the user selects the "Add New" option, the available SSID's are presented, at 412. In this illustration, the user can select one of three positions 414. Thus, after selecting the desired SSID, through the interface the position or number of the SSID can be selected. Thus, if the user desires to replace entry "1" with a new entry, the user can select "1" and the information currently in that position, if any, can be overwritten. The other positions (e.g., "2", "3" and so forth) operate in a similar manner. Selection of the location allows for multiple locations/access points and allows the user to independently select the desired access point to remove and/or replace.

The user (or the device autonomously) selects the desired SSID because of the multitude of access points that can be available at a particular location. At substantially the same time as the SSID is selected, the MAC address that is broadcast for the selected SSID can be captured by the device. Additional information can be captured or extracted, such as by a storage media associated with the device. Such information can include a Mobile Country Code (MCC), a Mobile Network Code (MNC), Local Area Code (LAC) and/or Cell ID. This information can be combined with an International Mobile Subscriber Identity (IMSI) and/or International Mobile Equipment Identity (IMEI) to create a message that can be delivered to a central network server or provider.

At substantially the same time as receiving the message, the central network server can make a determination whether the selected SSID should be accepted or denied. The number of times access points associated with a device can be modified can be limited. For example, a single entry can be modified only once per unit of time (e.g., 30 days). Thus, if there are three entries, a user can change an entry once each ten days if the user desires to change the entries as often as possible. However, the timing or frequency with which the access points can be changed can be determined or regulated by the server or network database and exceptions (e.g., more entries/changes, less entries/changes) can be provided based on the circumstances, user or other criteria.

Utilizing a full message or information feed transmitted from the device to the network database can make it difficult for a mobile device to subscribe to an access point in undesirable areas (e.g., foreign country). This is because the Mobile Country Code (MCC) received prior to pairing the MAC is an MCC for an area that the service provider (e.g., network database) would not allow pairing. In some embodiments, the service that a user can subscribe to might be established for a particular area, such as a local area or as small as a single cell site. In some embodiments, a subset or all conditions can be waived for pairing since these conditions can be set and controlled by the network database.

Figure 5:
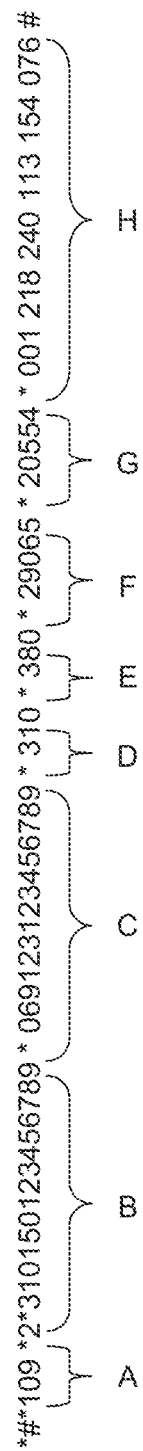
FIG. 5 illustrates an exemplary USSD code that can be utilized with the disclosed embodiments.

FIG. 5 illustrates an exemplary USSD code 500 that can be utilized with the disclosed embodiments. The code 500 can be utilized to initiate an IP Multimedia Subsystem/Dual Mode Service (IMS/DMS) MAC address capture and pairing. It should be understood that the spaces within the code are for ease of readability and understanding and are not necessarily part of the code.

A three-digit USSD code is illustrated at "A". While the exemplary code shows the USSD Code "A" as "109", any other code can be utilized and defined. The Entry Number is illustrated as the first number at "B". This entry number can be a change from an original selection and can indicate which position to enter the number (e.g., 1, 2, 3, and so on). The remaining fifteen digits of "B" can be the IMSI. Illustrated at "C" is a fifteen digit IMEI. A Mobile County Code on which the system was last registered is illustrated, at "D", as three-digits. "E" illustrates a three-digit Mobile Network Code on which the system was last registered. A five-digit LAC can be included in the code as illustrated at "F" and a five-digit Cell ID is illustrated at "G". An eighteen-digit modified decimal representation of a MAC address is illustrated at "H". The MAC address can be modified so that each pair of hex digits can be represented as a three-digit decimal number between 000 and 255. For example: 01:DA:F0:71:9A:4C, as modified can be represented as 001 218 240 113 154 076.

In view of the exemplary systems shown and described, methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed embodiments are not limited by the number or order of blocks, as some blocks may occur in different orders and/or concurrently with other blocks from what is depicted and described herein. Moreover, all illustrated blocks may be required to implement the methods described hereinafter. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methodologies to various devices. Those skilled in the art will understand and appreciate that a method could alternatively be represented as a series of interrelated states or events, such as in a state diagram.

Figure 6:
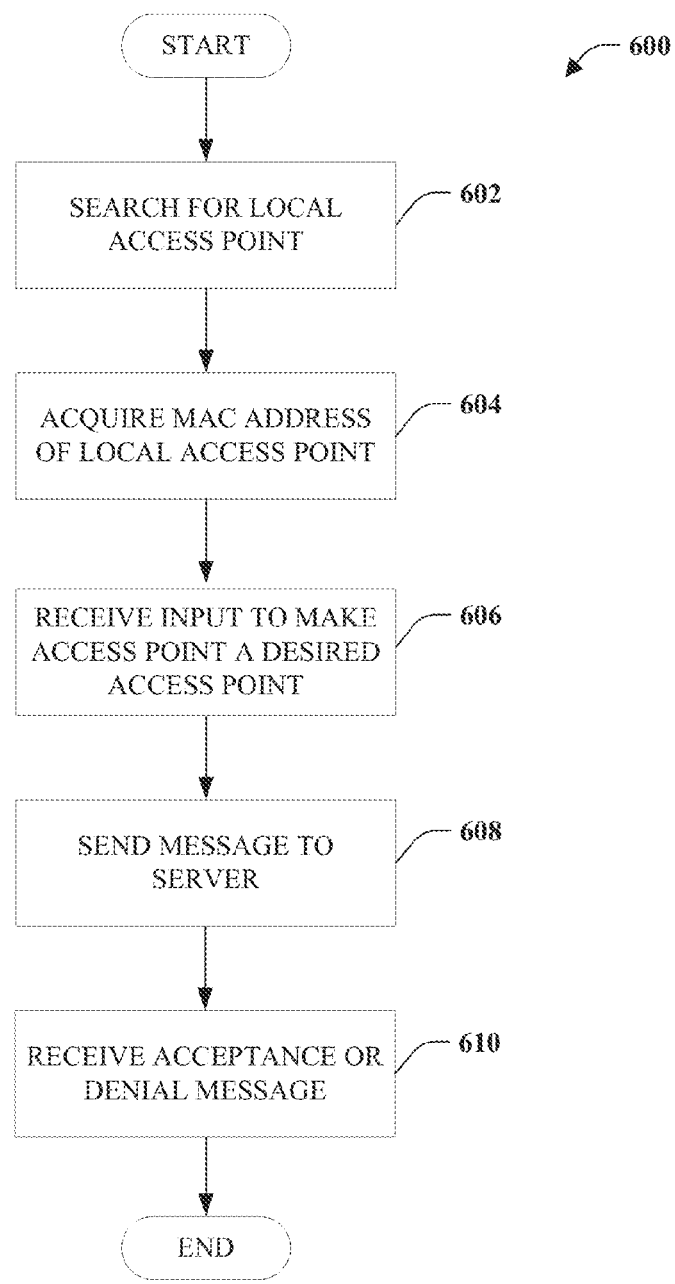
FIG. 6 illustrates a method for detecting and assigning various access points for seamless communication by a device.

FIG. 6 illustrates a method 600 for detecting and assigning various access points for seamless communication with a device. At 602, a user device can search for one or more access points within the vicinity of the device. The searching can be performed automatically by the device or based upon a user request. For example, a user can enter a USSD command (e.g., automatic feature of device, menu item, and so on) to acquire the MAC address of each access point in its vicinity. The device can listen for all access points it can hear from the broadcast information relating to that access point. The device can acquire the MAC address of the access point, at 604. This information can be captured in a storage media (e.g., memory) associated with the device. The device can also communicate a listing of all access points within the vicinity to the user so that the user can select a desired access point. Such selection can be made based on name of the device (e.g., "my_home_network", "my_work_network", and so on), signal strength and/or based on other criteria.

At 606, the access point whose MAC address was acquired can be designated as a desired access point. The designation can be based on the device autonomously selecting (as an input) the access point based on various criteria (e.g., location of the access point, strength of the signal received from the access point or based on other criteria). In some embodiments, the designation can be based upon an input from a user manually selecting the access point. For example, the user can select the access points through an interface associated with the device.

At substantially the same time as the access point is selected, a USSD message can be created by the device that contains useful information relating to the access point (e.g., mobile network code received by device and transmit mobile network code (reduces roaming), cell site identification that identify exactly where the customer is located (system being utilized and the cell site) and so forth). The information can be utilized to generate a USSD message to be forwarded to a server or Service Control Function (SCF) through USSD technology, at 608.

The server or SCF can make a determination whether the device can add the designated access point. Such determination can be made based on whether a threshold level of changes/additions of access points have been performed for this device within a predetermined interval. The determination can also be made based on whether the access point is available for designation by a device. At 610, the device can receive an acceptance message if the access point is available for the device. Thus, when the device comes within range of that wireless access point, it can seamlessly switch to that MAC address. If the device is not eligible to change the MAC address, a denial message can be received, at 610. The denial message can include information relating to the reason for the denial.

Figure 7:
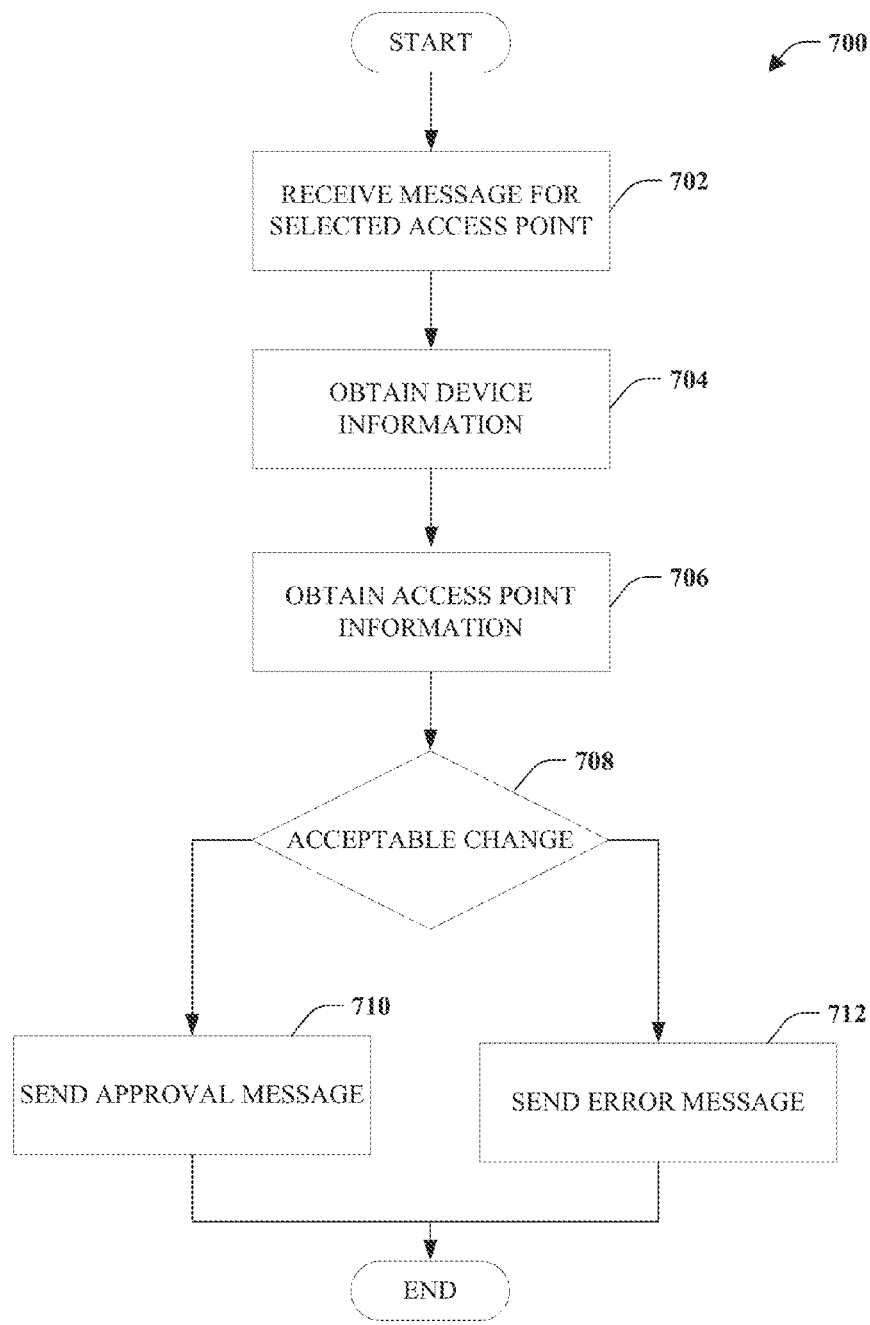
FIG. 7 illustrates a method for selectively approving access point assignments for a device.

FIG. 7 illustrates a method 700 for selectively approving access point assignment for a device. Method 700 starts, at 702, when a message is received from a user device for selection of an access point. This selection can be received in a USSD message or in other message formats. The message can include a MAC address of the access point, the position or number of the access point as referenced by the user device or other information relating to the access point and/or user device.

Based on the information received in the message, device information can be extracted from the message, at 704. The device information can be compared with a look-up database or table associated with a server or SCF. This database or table can include information relating the number of times an access point was selected/added by such device, the current access points selected by the device and/or other information. For example, the SCF can receive the information and determine if access point 1, 2, or 3 was selected (through the device input or user input).

The selection is forwarded to a database, at 706, that includes a look-up table containing access point information. The telephone number or other identifier of the access point can be extracted from the USSD message and applied to a special message that determines whether the device is eligible to change the MAC address based on information in the database, such a determination can be made at 708.

If the change/addition is acceptable, the change can be made and a confirmation or approval message is sent to the device, at 710. The change may be unacceptable if the access points selected by the device are for unlicensed networks and none (or a predetermined ratio) are on the licensed network, for example. The device can be updated with the MAC address of the access point. If the change/addition is unacceptable, an error message is sent to the device, at 712. In some embodiments, the error message can include the reason why the change is unacceptable. This information can be presented to the user and further action can be taken (e.g., wait a predetermined interval before attempting to update the access point information, contact the service provider, or other actions).

Figure 8:
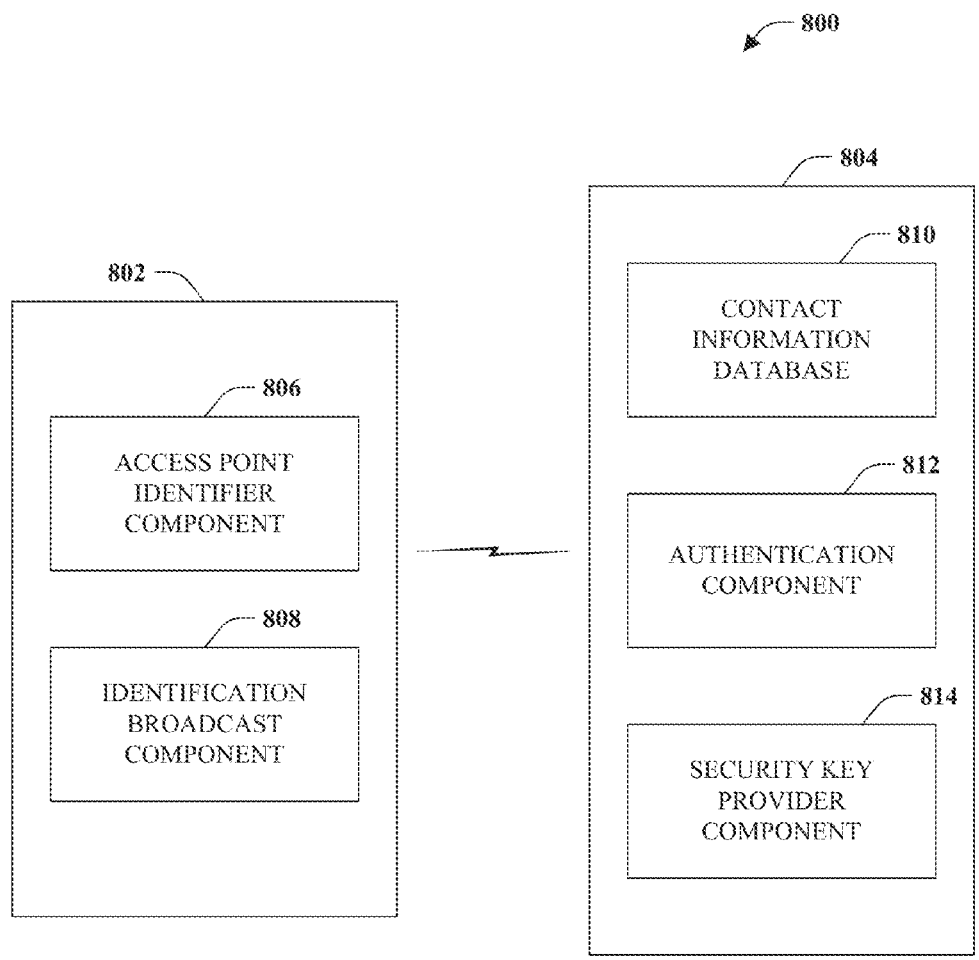
FIG. 8 illustrates a system for automatically providing connectivity through an access point when an identified device is within the vicinity of that access point.

FIG. 8 illustrates a system 800 for automatically providing connectivity through an access point when an identified device is within the vicinity of that access point. System includes one or more user devices 802 (only one is shown for simplicity) and a device associated with an access point 804. The user device 802 may be associated with a friend, associate, employee or other person known by the user and/or entity associated with the access point device 804.

The user device 802 can include an access point identifier component 806 that can be configured to search and identify access points within the vicinity of the device 802. Also included can be an identification broadcast component 808 that can be configured to broadcast information relating to the user device 802. The information can be broadcast when an access point is identified, periodically, continuously or in another manner.

The access point device 804 can be a communication device within a home or business (e.g., computer, mobile phone, PDA and so forth). Included in the access point device 804 can be a contact information database 810 that can include contact information (e.g., friend, employee, associate, coworker and so on). The contact information can include a MAC address, IP identifier, telephone number or other reference that identifies the device 802 as that of a contact identified in the contact information database 810.

An authentication component 812 can determine if the information broadcast by the user device 802 matches a reference in the contact information database 810. If there is a match, the user device 802 can be authenticated or authorized to use the access point in that vicinity. There can be a handoff, performed by security key provider component 814 that can receive the authentication information and automatically transmit a security key (e.g., web key) that can allow the user device 802 to automatically recognize the access point and obtain connectivity through that access point. In some embodiments, connectivity through the access point is temporarily disabled to allow the device 802 to be authenticated.

For example, a first user obtained information relating to a friend and a device associated with the friend and such information (e.g., telephone number, MAC address, and so forth) is entered into the contact information database 810. This information can also be entered automatically through interaction between the devices and confirmed by the first user. When the friend comes within vicinity of the access point device 804 (e.g., enters the home of the first user), the access point device 804 can recognize that user device 802 based on the device information. In such a manner, a trusted person (e.g., friend, employee and so forth) can utilize the access point even if it is not an access point pre-designated by the device 802, as described above. In some embodiments, the number of contacts able to access connectivity through the access point device 804 can be limited.

Figure 9:
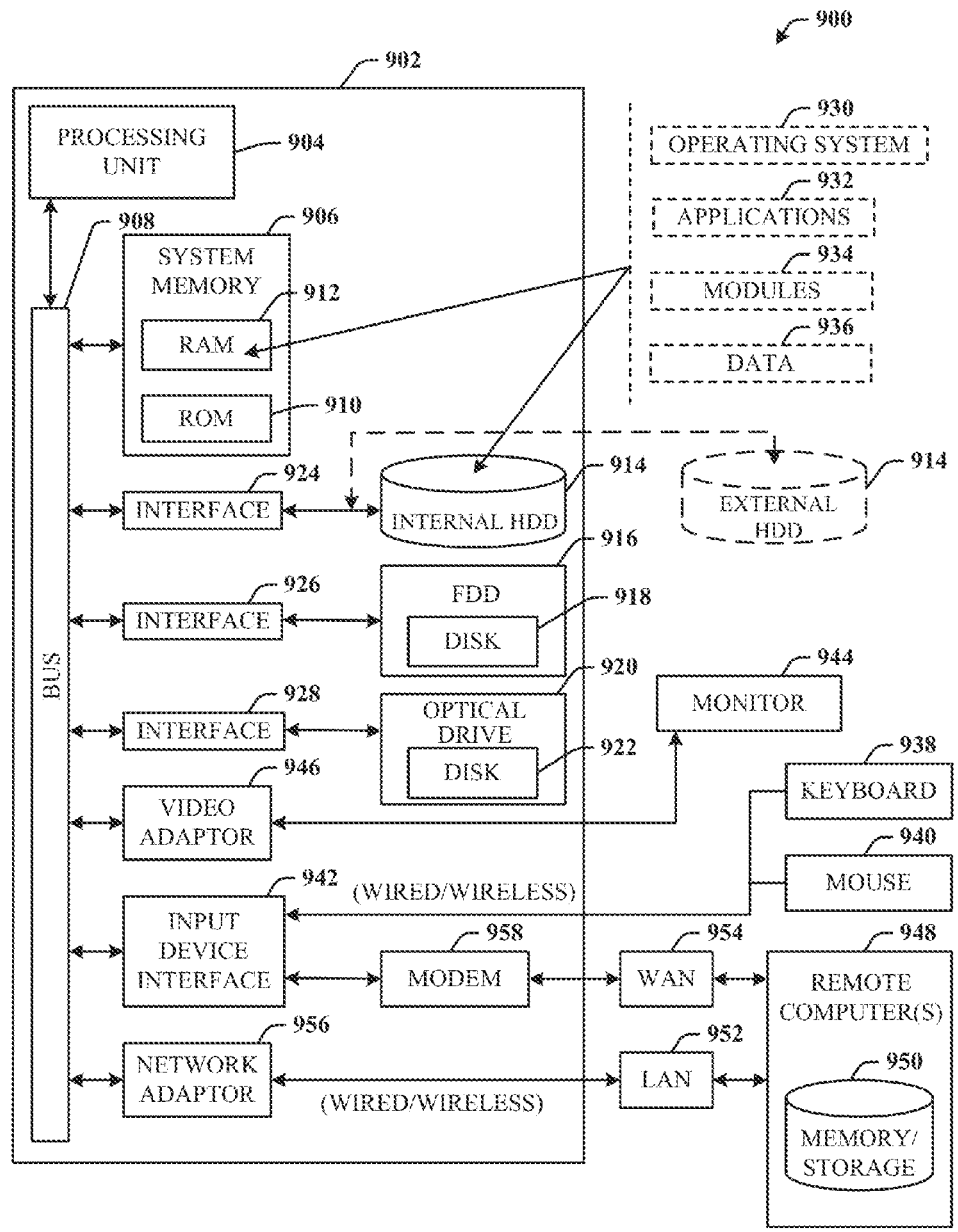
FIG. 9 illustrates an exemplary computing environment that can be employed in connection with various aspects described herein.

Referring now to FIG. 9, there is illustrated a block diagram of a computer operable to aid in provisioning of dual mode services as described above. In order to provide additional context for various aspects of the claimed subject matter, FIG. 9 and the following discussion are intended to provide a brief, general description of a suitable computing environment 900 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various embodiments can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from home, in a hotel room, or at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
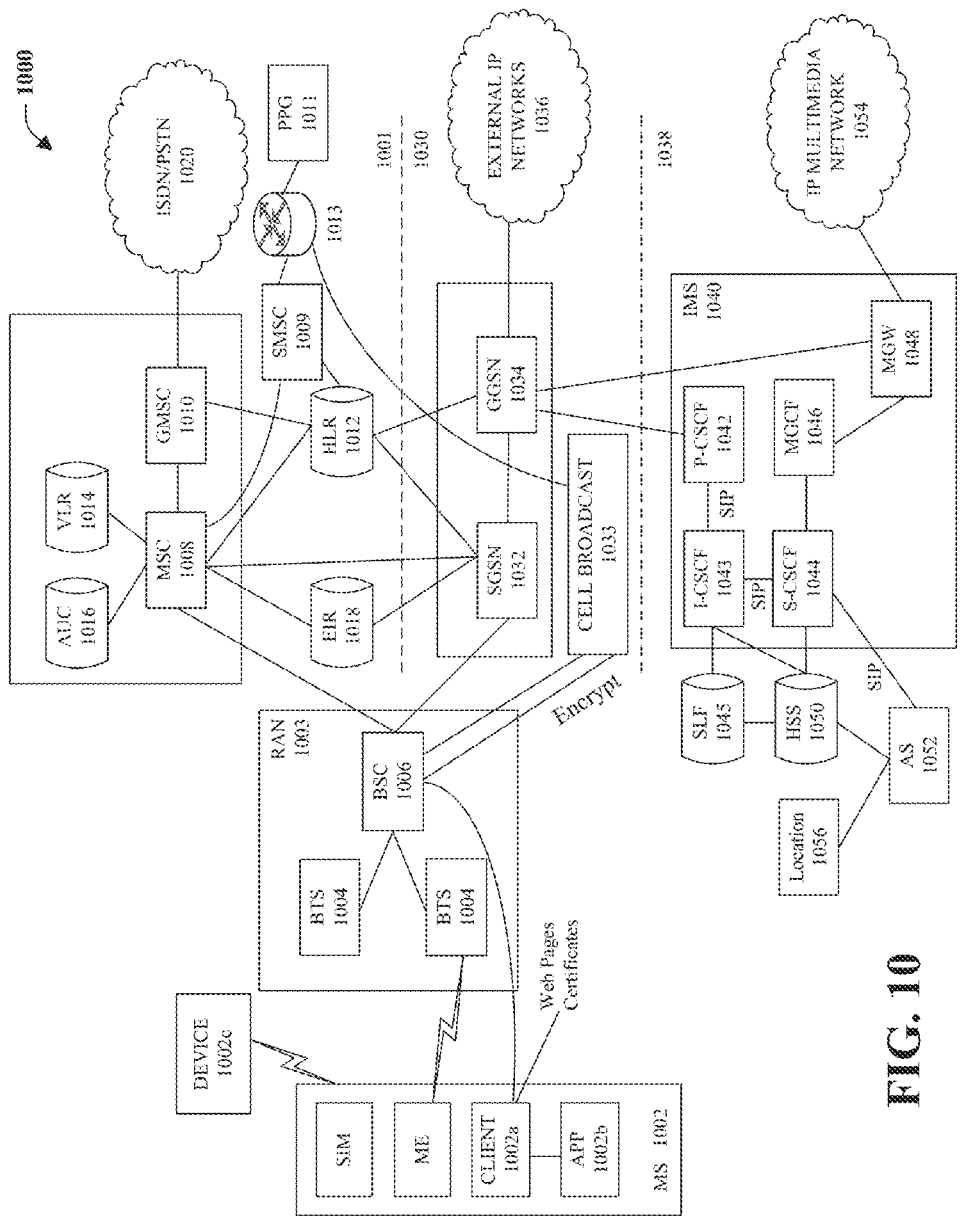
FIG. 10 illustrates an exemplary networking environment that can be employed with the disclosed embodiments.

Now turning to FIG. 10, illustrated is a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a may be implemented in JAVA and is discussed more fully below.

The embedded client 1002a communicates with an application 1002b that provides services and/or information to an end user. One example of the application may be mobile merchant software that provides real-time payment transaction information that is received by the embedded client 1002a to the end user. The mobile merchant software may provide availability of a mobile merchant service, status or confirmation of a payment transaction, etc. based on information received from the MS 1002.

Alternatively, the MS 1002 and a device 1002c may be enabled to communicate through a short-range wireless communication link, such as BLUETOOTH. For example, a BLUETOOTH SIM Access Profile may be provided in an automobile (e.g., device 1002c) that communicates with the SIM in the MS 1002 to enable the automobile's communications system to pull information from the MS 1002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1002c. There may be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1016, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, through the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSSs 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the disclosed embodiments. It is, of course, not possible to describe every conceivable combination of components or methodologies for purposes of describing the embodiments, but one of ordinary skill in the art may recognize that many further combinations and permutations of such matter are possible. Accordingly, the embodiments are intended to embrace all such alterations, modifications and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."Furthermore, the term "or" as used in either the detailed description of the claims is meant to be a "non-exclusive or".

What is claimed is:

1. A system, comprising:
   a processor; and
   a memory that stores executable instructions that, when executed by the processor, facilitate performance of operations, comprising:
   storing information related to an access point device authorized for a transfer of a communication and address data representing a media access control address corresponding to the access point device in response to reception of an input that selects the access point device, wherein the information comprises information relating to a frequency of selection of the access point device by a mobile device;
   receiving the address data in response to a determination that the mobile device is in range of a location of the access point device, in response to the mobile device being determined to have received an indication of a signal strength of the access point device, and in response to a condition related to the frequency of selection of the access point device being satisfied; and
   sending the address data in an unstructured supplementary service data message directed to a server device for another determination of whether the access point device is accessible at the location corresponding to the media access control address and whether the access point device is authorized for the transfer of the communication.

2. The system of claim 1, wherein the unstructured supplementary service data message is sent to a home location register device.

3. The system of claim 1, wherein the storing the information comprises storing location information of the access point device.

4. The system of claim 1, wherein the input comprises a manual selection of the access point device via the mobile device.

5. The system of claim 1, wherein the operations further comprise receiving availability information representing a set of access point devices, comprising a denial message based on a selection of an unavailable access point device of the set of access point devices.

6. The system of claim 1, wherein the sending further comprises sending an error message if the access point device is not authorized for the transfer of the communication.

7. The system of claim 1, wherein the sending further comprises receiving availability information representing a set of available access point devices, comprising an acceptance message based on an available access point device of the set of available access point devices.

8. A method, comprising:
storing, by a system device comprising a processor, information related to an access point device authorized for a transfer of a communication and address data representing a media access control address corresponding to the access point device in response to reception of an input that selects the access point device, wherein the information comprises information relating to a frequency of selection of the access point device by a mobile device;
receiving, by the system device, the address data in response to a determination that the mobile device is in range of a location of the access point device, in response to the mobile device being determined to have received an indication of a signal strength of the access point device, and in response to a condition related to the frequency of selection of the access point device being satisfied; and
sending, by the system device, the address data in an unstructured supplementary service data message directed to a server device for another determination of whether the access point device is accessible at the location corresponding to the media access control address and whether the access point device is authorized for the transfer of the communication.

9. The method of claim 8, further comprising searching, by the system device, for the access point device within a number of access point devices that are within a defined radius of the device.

10. The method of claim 8, further comprising storing, by the system device, contact information related to a first number of access point devices, wherein the contact information comprises media access control address information.

11. The method of claim 8, further comprising storing, by the system device, contact information related to a second number of access point devices, wherein the contact information comprises internet protocol identifier information.

12. The method of claim 8, further comprising storing, by the system device, contact information related to a first number of access point devices, wherein the contact information comprises telephone number information.

13. The method of claim 8, further comprising authorizing, by the system device, a first number of access point devices for a handoff of a communication, wherein the first number of access point devices is less than a second number of access point devices that is defined according to a mobile service agreement of a service provider identity.

14. The method of claim 8, further comprising facilitating, by the system device, a rendering of a second number of access point devices via a mobile device.

15. A non-transitory computer readable storage medium having instructions stored thereon that, in response to execution, cause a system comprising a processor to perform operations, comprising:
storing information related to an access point device authorized for a transfer of a communication and address data representing a media access control address corresponding to the access point device in response to reception of an input that selects the access point device, wherein the information comprises information relating to a frequency of selection of the access point device by a mobile device;
receiving the address data in response to a determination that the mobile device is in range of a location of the access point device, in response to the mobile device being determined to have received an indication of a signal strength of the access point device, and in response to a condition related to the frequency of selection of the access point device being satisfied; and
sending the address data in an unstructured supplementary service data message directed to a server device for another determination of whether the access point device is accessible at the location corresponding to the media access control address and whether the access point device is authorized for the transfer of the communication.

16. The non-transitory computer readable storage medium of claim 15, wherein the operations further comprise sending an acceptance message in response to determining that the media access control address corresponds to an authorized access point device.

17. The non-transitory computer readable storage medium of claim 15, wherein the operations further comprise authorizing the access point device for a transfer of a communication, wherein the access point device is defined according to service provider agreement data.

18. The non-transitory computer readable storage medium of claim 15, wherein the operations further comprise sending an error message to a device in response to determining that the access point device is an unauthorized access point device, and wherein the error message comprises information on an action to be taken by a user.

19. The non-transitory computer readable storage medium of claim 15, wherein the operations further comprise sending an error message to a device in response to determining that the access point device is an unauthorized access point device, and wherein the error message comprises information related to a determination that the access point device is an unauthorized access point device.

20. The non-transitory computer readable storage medium of claim 15, wherein the operations further comprise sending an acceptance message in response to determining that the access point device has been authorized for the transfer of the communication.

* * * * *